C. A. SWANSON & A. B. BROOKE.
STEAM HOSE.
APPLICATION FILED FEB. 26, 1912.

1,052,861.

Patented Feb. 11, 1913.

Witnesses
D. P. Winston.
A. B. Decker.

Inventors
Charles A. Swanson
Albert Bushong Brooke
By Delbert H. Decker
Attorney

UNITED STATES PATENT OFFICE.

CHARLES A. SWANSON AND ALBERT BUSHONG BROOKE, OF HANCOCK, MARYLAND.

STEAM-HOSE.

1,052,861. Specification of Letters Patent. Patented Feb. 11, 1913.

Application filed February 26, 1912. Serial No. 679,879.

*To all whom it may concern:*

Be it known that we, CHARLES A. SWANSON and ALBERT BUSHONG BROOKE, citizens of the United States, residing at Hancock, in the county of Washington and State of Maryland, have invented certain new and useful Improvements in Steam-Hose, of which the following is a specification.

This invention relates to hose and particularly to hose especially designed and intended for conveying motive fluid under pressure to movable tools or implements to be driven by said fluid.

The principal object of this invention is to furnish a hose especially constructed for conveying steam to drills or like tools. A hose for this purpose must be able to hold steam, adapted to bend without kinking, and sufficiently resistant to mashing to avoid the necessity of providing special housing therefor between the source of steam and the tool driven thereby.

To this end the invention consists in a hose lined with a tube or pipe of moderately flexible metal such as lead or annealed copper interiorly sustained throughout its length by a spiral of wire and about which tube there is a considerable layer of compressible material and this in turn surrounded by a shield sufficiently flexible to permit the required bending of the hose.

Other features of the invention will appear in the following detailed description and appended claims.

Figure 1:
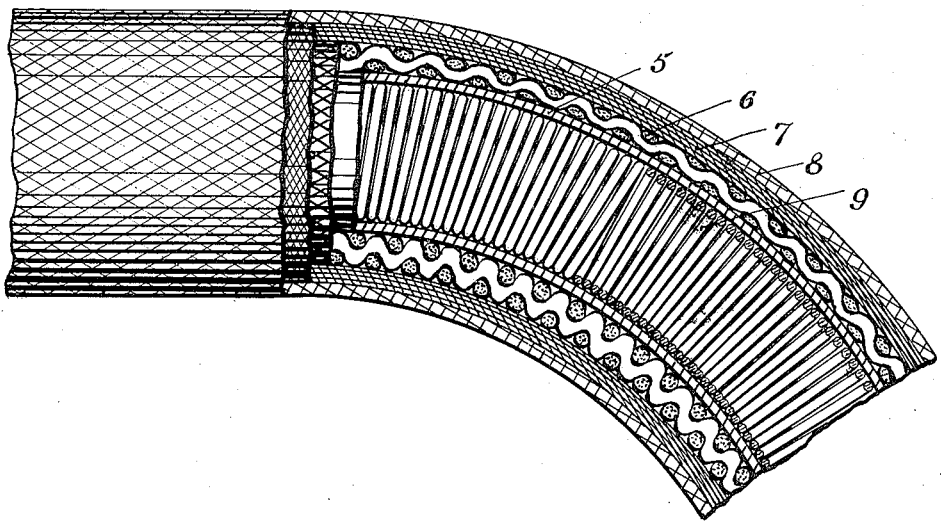
Figure 2:
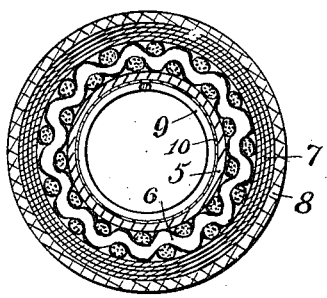

In the accompanying drawings which form a part of this specification, Figure 1 represents the improved hose in partially sectionized axial section; and Fig. 2 represents the hose in transverse section with an additional part inserted.

The metallic lining of the hose is represented at 5, and may be an ordinary lead pipe or one of annealed copper. The essential features of this element are imperviousness and flexibility. The terms pipe and tube as herein used signify an inarticulated structure—not one made up of sections or successive convolutions.

To permit bending to a reasonable and safe extent the tube 5 is surrounded by a compressible layer such as asbestos fabric indicated at 6, and to shield this and assist in limiting the extent of bending to a safe degree, the asbestos layer is preferably surrounded by several closely wound layers of canvas 7. The layers of canvas may or may not be cemented together. A greater degree of flexibility is provided when they are not cemented. Unless rubber is used in cementing the layers of canvas together there is none of it in the hose, since it is not needed to make the hose impervious to the motive fluid. The metallic lining serves that purpose.

Any suitable shield may be applied about the canvas to take the wear on the hose. A coarse woven fabric such as used on fire hose serves the purpose well. Such a protecting covering is indicated at 8.

The hose as thus far described might by successive bending at the same place, result in kinking the lead pipe. To avoid such a result a spiral of wire closely wound and with the spirals at low pitch is inserted in the lead pipe and extends from end to end thereof. Such spiral is represented at 9. This spiral will also resist a very considerable weight which might otherwise crush the hose. It is also well in some cases, as in a quarry where the steam hose is handled considerably, to place a tube of fabric between the spiral and the lead pipe as indicated in Fig. 2 at 10, thereby to prevent the coils of the spiral from chafing through the lead. A hose of this sort bends with sufficient readiness and to the desired extent without breaking or kinking the metallic pipe lining. As indicated in Fig. 1, the compressible layer 6 allows sufficient yielding between the pipe and the canvas tube to provide for this. At the same time the stiffness of the canvas tube 7 and surrounding shield 8 materially assist in preventing short bends such as would permit the pipe to kink.

The compressible layer 6 may be made of other material than asbestos, but when the motive fluid is steam, asbestos is the best material for said layer, because of its being a non-conductor of heat and because it is not detrimentally affected by the heat of the pipe. It is preferable that the material of the layer 6 be in fabric form in order that it be not displaced at points where the pipe bends in handling the hose.

The invention claimed is:—

1. A steam hose consisting of a lead pipe, a spiral of closely coiled wire within to sustain said pipe against kinking, a layer of suitable material interposed between said spiral and said pipe to prevent the spiral from chafing the lead, a non-conducting covering for the pipe and a protecting cover surrounding the non-conducting cover.

2. As an article of manufacture, a steam hose consisting of a lead pipe integral continuous and impervious, a spiral of wire closely coiled and of low pitch located within and longitudinally of said pipe to sustain the lead against kinking, a sheath of fabric interposed between the pipe and the spiral to prevent the spiral from chafing the pipe, a layer of asbestos fabric loosely woven of soft yarn overlying said pipe for the purpose set forth, a layer of canvas over the asbestos to assist in sustaining it, and a protecting tube of coarse woven fabric over all.

In testimony whereof we affix our signatures in presence of two witnesses.

CHARLES A. SWANSON.
ALBERT BUSHONG BROOKE.

Witnesses:
A. A. SWINGLE,
J. B. BROSIUS.